(12) United States Patent
Jones et al.

(10) Patent No.: US 6,829,293 B2
(45) Date of Patent: Dec. 7, 2004

(54) METHOD AND APPARATUS FOR LINE PROBE SIGNAL PROCESSING

(75) Inventors: William W. Jones, San Diego, CA (US); Ragnar H. Jonsson, Raykjavik (IS); Sverrir Olafsson, Reykjavik (IS)

(73) Assignee: Mindspeed Technologies, Inc., Newport Beach, CA (US)

( * ) Notice: Subject to any disclaimer, the term of this patent is extended or adjusted under 35 U.S.C. 154(b) by 790 days.

(21) Appl. No.: 09/764,167

(22) Filed: Jan. 16, 2001

(65) Prior Publication Data

US 2003/0076878 A1 Apr. 24, 2003

(51) Int. Cl.$^7$ .............................. H04B 1/38; H04L 5/16
(52) U.S. Cl. ...................... 375/222; 375/343; 375/227; 375/257
(58) Field of Search ............................... 375/219, 220, 375/222, 225, 227, 343, 257

(56) References Cited

U.S. PATENT DOCUMENTS

| | | | |
|---|---|---|---|
| 4,719,643 A | | 1/1988 | Beeman |
| 4,947,425 A | | 8/1990 | Grizmala et al. |
| RE35,607 E | | 9/1997 | Nagamune et al. |
| 5,699,402 A | | 12/1997 | Bauer et al. |
| 5,940,439 A | * | 8/1999 | Kleider et al. ............... 375/225 |
| 6,002,671 A | | 12/1999 | Kahkoska et al. |
| 6,058,162 A | | 5/2000 | Nelson et al. |
| 6,075,628 A | | 6/2000 | Fisher et al. |
| 6,215,793 B1 | * | 4/2001 | Gultekin et al. ............ 370/465 |
| 6,426,971 B1 | * | 7/2002 | Wu et al. ..................... 375/227 |
| 6,535,551 B1 | * | 3/2003 | Sweitzer et al. ............ 375/225 |
| 6,633,545 B1 | * | 10/2003 | Milbrandt .................... 370/252 |
| 6,647,058 B1 | * | 11/2003 | Bremer et al. ............... 375/222 |

FOREIGN PATENT DOCUMENTS

| | | |
|---|---|---|
| EP | 0880258 A2 | 11/1998 |
| JP | 09321674 A | 12/1997 |

OTHER PUBLICATIONS

Taylor, V. and Faulkner, M.; *Line Monitoring and Fault Location Using Spread Spectrum on Power Line Carrier*; Published in IEE Proc.– Gener. Transm. Distrib., vol. 143, No. 5, Sep. 1996; pp. 427–434.

Hwang, L., Rinne, G. and Turlik, I.; *An Extended Time–Domain Network Analysis Measurement Technique*; Published in IEEE Transactions on Components, Packaging, and Manufacturing Technology, Part B, vol. 18, No. 2, May 1995; pp. 375–380.

Dhaene, T., Martens, L. and Zutter, D.; *Calibration and Normalization of Time Domain Network Analyzer Measurements*; Published in IEEE Transactions on Microwave Theory and Techniques, vol. 42, No. 4, Apr. 1994; pp. 580–589.

Hayden, L. and Tripathi, V.; *Calibration Methods for Time Domain Network Analysis*; Published in IEEE Transactions on Microwave Theory and Techniques, vol. 41, No. 3, Mar. 1993; pp. 415–420.

(List continued on next page.)

*Primary Examiner*—Phuong Phu
(74) *Attorney, Agent, or Firm*—Weide & Miller, Ltd.

(57) ABSTRACT

A system, method, and signal are disclosed for line probing. The invention provides an improved signal for line probing having desirable characteristics. In various embodiments the signal comprises a periodic sequence having good autocorrelation characteristics. The periodic sequence of the invention provides a faster and more accurate evaluation of the channel. Another embodiment of the invention comprises processing of the received sequence to determine a desired or maximum data rate for the line or channel. The invention also provides an evaluation and calculation of the noise on the line or channel.

38 Claims, 11 Drawing Sheets

OTHER PUBLICATIONS

Su, W., and Riad, S.; *Calibration of Time Domain Network Analyzers*; Published in IEEE Transactions on Instrumentation and Measurement, vol. 42, No. 2, Apr. 1993; pp. 157–161.

Boets, P. and Van Biesen, L.; *The Modelling Aspect of Transmission Line Networks*; 1992; pp. 137–141.

Munk, A. and Cusick, J.; *A Time Domain Analysis of a Calibration Error Model*; 1991; pp. 22–26.

Pintelon, R., and Van Biesen, L.; *Identification of Transfer Functions With Time Delay and Its Application to Cable Fault Location*; Published in IEEE Transactions on Instrumentation and Measurement, vol. 39, No. 3, Jun. 1990; pp. 479–484.

Van Biesen, L., Renneboog, J. and Barel, A.; *High Accuracy Location of Faults on Electrical Lines Using Digital Signal Processing*; Published in IEEE Transactions on Instrumentation and Measurement, vol. 39, No. 1, Feb. 1990; pp. 175–179.

Publisher: IEEE; Steven A. Newton; *Novel Approaches to Optical Reflectometry*; pp. 329–333; 1990.

Jack Glas; Circuits Systems; The Principles of Spread Spectrum Communication; last modified Aug. 29, 1996 (internet research).

Dr. George Zimmerman; PairGain Technologies; HDSL2 Tutorial: Spectral Compatibility and Real–World Performance Advances; Jun. 23, 1998; Sweden; pp. 1 through 12.

Cisco Systems, Inc.; Configuring Subscriber Equipment for Use with the Cisco 90i IDSL Channel Unit; pp. 1 through 9; 1989–1998.

Cambridge University Press; Numerical Recipes Software in C: The Art of Scientific Computing; Correlation and Autocorrelation Using the FFT; pp. 545 through 558 (located on the internet).

Jack P.F. Glas; Code Selection; last modified on Nov. 13, 1996 (located on the internet).

* cited by examiner

METHOD AND APPARATUS FOR LINE PROBE SIGNAL PROCESSING

BACKGROUND OF THE INVENTION

1. Technical Field

This invention relates generally to communications and in particular to a system and method for line probing and provisioning.

2. Related Art

Historically, new communication technologies are continually being introduced to improve the ease and rate at which data can be exchanged between remote locations. One factor that must be considered when communicating electronic data is the medium over which the data will travel. This is often referred to as determining the channel quality, line characteristics, line transfer function, insertion loss, or channel impulse response. One example medium that is commonly installed throughout the world is twisted pair conductors as were traditionally used to provide telephone service between a central office telephone facility and a residence or business.

The medium must be considered because the medium can affect the rate at which communication may occur. For example, digital subscriber line (DSL) technology utilizes twisted pair conductors. The rate at which systems using the DSL standards may operate is determined in part by the electrical characteristics of the twisted pair between a transmitting device and the receiving device. The factors that control the rate of communication may include the distance between the receiver and transmitter, presence of bridge taps or load coils, the quality of the twisted pair, the quality of connections to the twisted pair, and the amount of noise that the twisted pair picks up, such as cross talk noise. Moreover, the line may have certain unique frequency ranges at which communication should not occur due to noise or other undesirable line attributes.

It is often desirable to determine the characteristics of the line prior to communicating data so that a maximum data rate may be determined. This improves reliability and allows the receiver/transmitter pair to communicate at a data rate that the line can support. A lower data transmission rate than the maximum data rate may be used for operational reasons.

Various methods have been proposed to measure the line characteristics. One method comprises sending a first signal at a first frequency on the line and analyzing the response of the tone to the effects of the line. Based on the response of the first signal, a second signal at a second frequency is sent and the effect of the line on the signal is evaluated. This process continues in a searching or hunting manner to determine the characteristics of the line or until an acceptable data rate is determined after a fixed number of iterations.

An alternate method comprises sending pseudo-random signals on the line, which are of known bit patterns, and then calculating the bit error rate of the received signal via comparison techniques. If the bit error rate is too high, another pseudo-random signal is sent at a different data rate and the calculation process repeated. This process is reiterated until an acceptable bit error rate is calculated.

While these methods are often implemented in prior art devices, they are plagued by several drawbacks. One drawback is that these methods of line evaluation are very time consuming. Both methods implement a search method that performs several reiterations in serial order in an effort to arrive at a line characterization. Each reiteration takes a certain amount of time and hence an undesirably large period of time is consumed when numerous reiterations are performed. In the particular case of the BER method, the time required to compute the BER can be quite lengthy. Numerous iterations may be required since an error probability of less than 1e-7 is desired. As a result, a new communication technology designed to speed the rate of communication may appear to the user to take longer to configure and initiate operation than the prior 'slower' technology.

Another drawback of prior art methods is that because of their hunt-and-peck type operation, the line characterization may be inaccurate. For example, the search process using different tones or data rates does not perform an analysis at each frequency in the spectrum. Hence, the prior art method of line characterization may not provide all the information necessary to fully characterize the line and thereby not identify undesirable frequency bands. In addition, the prior art methods propose the use of data rates that in many instances were so inaccurate that the line could not support the proposed data rate. This occurred because the processing of the probe signals did not correctly characterize the line. Moreover, if the line characterization was inaccurate, the communication session may fail during use and the time consuming line characterization process would have to be repeated. Even if repeated, the line characterization may again be inaccurate and the communication session will again fail.

The invention overcomes the disadvantages of the prior art by providing a signal for line probing and a method for processing the line probe signal that provides for more rapid and efficient line probing.

SUMMARY

In one embodiment the invention comprises a line probe signal and method of generating the same for use in determining line characteristics. In one embodiment the invention comprises a method and apparatus for processing a line probe signal to determine channel characteristics, such as to determine a data rate for the line.

One embodiment of the invention comprises generation and/or use of sequence signals for line probing. The inventors discovered that sequence signals provide advantages for use as line probe signals as compared to prior art signals, methods, or apparatus used for line probing. One example type of sequence signal comprises a signal with good autocorrelation properties. Good autocorrelation properties provide the advantage during processing of approximation to an impulse signal to thereby estimate the channel response and reveal the line characteristics. Autocorrelation is a type of correlation.

In one embodiment an example signal comprises a maximal length sequence (M-sequence). These sequences may be selected with various periods. Sequences with long periods provide a more accurate and complete impulse response based on more probing tones and provide the advantage of noise spreading during signal processing. Sequences with a short period provide the advantage of faster line probing.

In one method of operation, a sequence signal is generated using a scrambler device of a transmitter portion of a transceiver. The transmitter sends the sequence signal over the line for purposes of line probing. The line probe signal may be transmitted at various times or at start-up of the transmitter. After transmission, a receiver receives the sequence signal and performs processing on the sequence signal to evaluate the line characteristics. Based on the calculated line characteristics, a desired or maximum data rate for the line may be determined. Various methods exist for processing the sequence signal and hence the inventive use of sequence signals with good autocorrelation properties is not limited to a particular method of processing or generation.

In one embodiment of the invention a method and apparatus for processing the line probing sequence is provided. Processing the line probe sequence signal is performed to evaluate the noise on the line and/or to calculate and determine line characteristics so that in one embodiment a desired data transmission rate may be calculated. In one instance, the desired data rate is the maximum data transmission rate that the line will support.

In one embodiment and method of operation a received sequence signal is processed by performing a cross correlation operation on the received signal and a reference signal to generate an output signal generally approximating an impulse signal transmitted over the line. The line characteristics may then be determined based on the estimated impulse response.

In one embodiment and method of operation noise on the line may be evaluated by ceasing transmission of any signal by the transmitter and monitoring, at the receiver, for any signal received. Because the transmitter is not sending any signal, any received signal is considered to comprise noise. One example of noise comprises crosstalk.

In one embodiment, the data rate may be determined by establishing a target signal to noise ratio (SNR) that is acceptable. Coding gain and a desired margin may be considered in the SNR target selection. After a target SNR value is selected, one method of operation calculates the highest data rate where the computed SNR is greater than the target SNR value. This calculation may be based on the line noise in the frequency domain and the received signal power spectral density, which is a function of the impulse response of the line. Interpolation around the calculated point may optionally be performed to refine the data rate estimation.

The various embodiments, features, elements, and aspects of the invention as described broadly herein may be combined in any combination or may be implemented individually. For example, an embodiment comprising use of a sequence signal for line probing may be implemented alone or in conjunction with a method of processing the sequence signal to obtain a desired or maximum data rate for the line being probed. Thus, the scope is not limited to only the described combinations but is intended to cover any various combination as might be contemplated after reading the specification and claims.

Other systems, methods, features and advantages of the invention will be or will become apparent to one with skill in the art upon examination of the following figures and detailed description. It is intended that all such additional systems, methods, features and advantages are included within this description, are within the scope of the invention, and are protected by the accompanying claims.

BRIEF DESCRIPTION OF THE FIGURES

The invention can be better understood with reference to the following figures. The components in the figures are not necessarily to scale, emphasis instead being placed upon illustrating the principals of the invention. Moreover, in the figures, like reference numerals designate corresponding parts throughout the different views.

DETAILED DESCRIPTION

Figure 1:
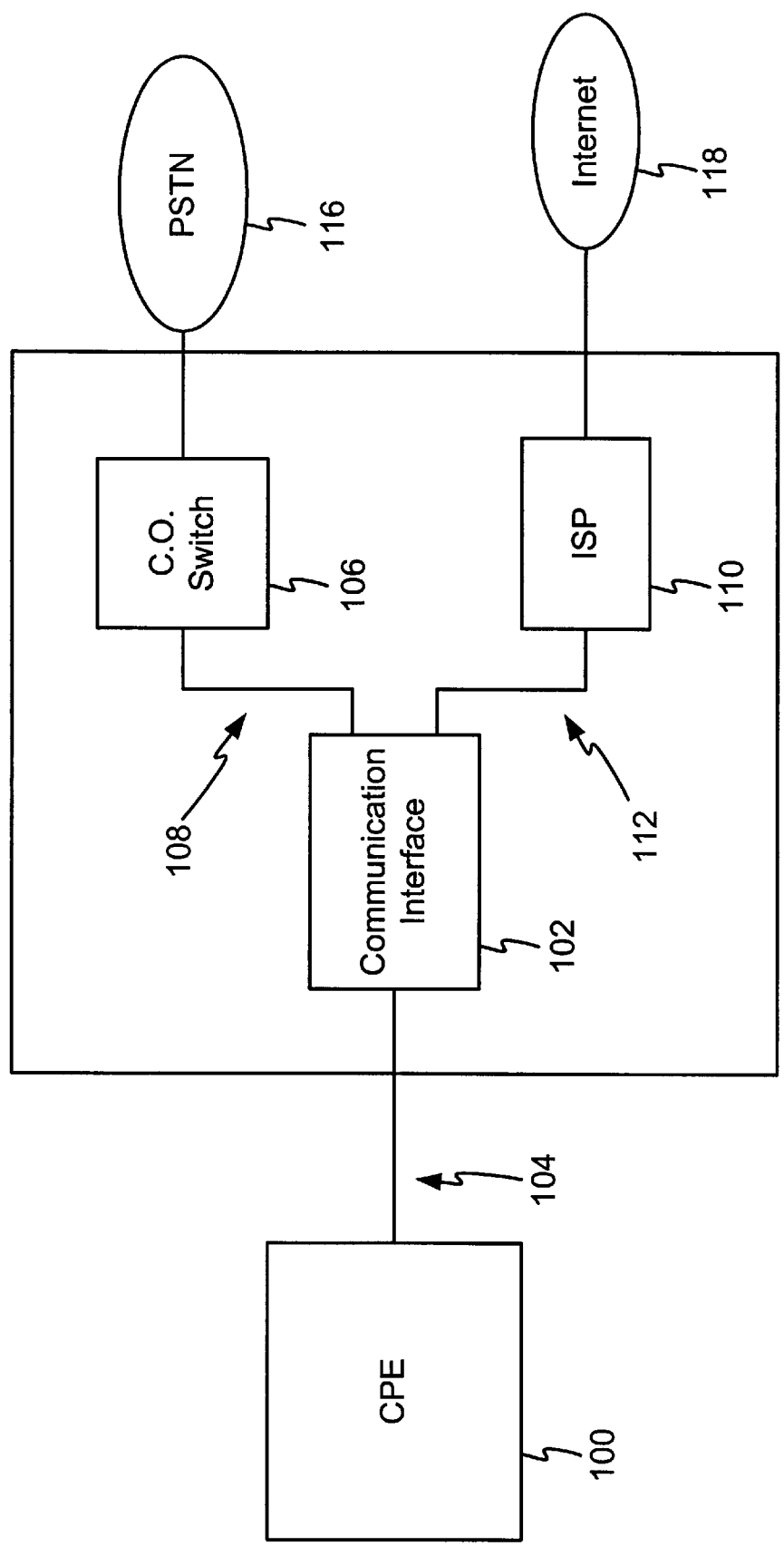
FIG. 1 is a block diagram of an example environment of the invention.

In one embodiment the invention provides an alternate class or type of signal to use for line probing that overcomes the drawbacks of the prior art. FIG. 1 illustrates an example environment for use of the invention. The example environment shown in FIG. 1 is provided for purposes of discussion and is not in any way intended to limit the scope or breadth of the invention. It is contemplated that the invention find use in a plurality of other environments, such as any environment where it is desired to obtain information regarding line characteristics for the purposes of communication over the line. The line to be probed may comprise any type of conductor or channel including a twisted pair conductor, a wireless channel or an optic channel.

FIG. 1 illustrates customer premise equipment (CPE) 100 in communication with a communication interface 102 over a first line 104. The CPE 100 comprises any communication device that is generally located remote from the communication interface 102 and configured to facilitate communication over the first line 104. In one embodiment the CPE 100 comprises a communication modem or communication device located at a business or residence. The CPE 100 may comprise, but is not limited to, any device operating under the digital subscriber line (DSL) standard, any voice band modem, cable modem, wireless modem, power line modem, or any other device configured to perform digital or analog communication. It is contemplated that at each of the CPE 100 and the communication interface 102, a receiver and transmitter may send and receive data over the line 104.

The first line 104 may comprise any communication medium intended to carry communication signals. In various embodiments the first line 104 comprises, but is not limited to, one or more conductor of a twisted pair of conductors, coax cable, power line, optic cable, or a wireless channel. Although the first line is shown as a single line, it should be understood that he line 104 may comprise any configuration or number of conductors, optical paths, or wireless paths.

In this embodiment the communication interface 102 comprises any communication equipment configured to communicate with the CPE 100 over the first line 104. With regard to the DSL standard, the communication interface 102 may comprise a digital subscriber line access multiplexer (DSLAM). As shown the DSLAM is configured to facilitate communication over the first line 104 between the CPE 100 and a central office (CO) switch 106 and an Internet Service Provider (ISP) 110.

The communication with the CO switch 106 occurs over a second line 108 while communication with the ISP 110 occurs over a third line 112. The communication interface 102 appropriately routes certain voice communication from the CPE 100 to the CO switch 106 while appropriately routing certain data communication from the CPE to the ISP 110. As shown, the CO switch 106 may connect to the PSTN 116 thereby serving as a switching and routing service for telephone, facsimile, or data calls. The ISP 110 may connect to the Internet 118 to provide access to a plurality of other networked computers.

It is contemplated that the various embodiments of the invention may be used to evaluate the characteristics of the first line 104, the second line 108 or the third line 112 to thereby determine characteristics including, but not limited to, the maximum data rate that the line will support. It is desired to obtain the highest data rate supportable by the lines 104, 108, 112 so that a maximum amount of data may be transferred in a minimum amount of time. This enables more rapid upload, downloads, and greater and more reliable use of the lines 104, 108, 112. It is also contemplated the invention may be practiced at any location in the communication system, such as at the CPE side or the CO switch side. The invention may also be used to determine a data rate for each leg or path for symmetrical communication (identical or similar data transmission rates between devices) or asymmetrical communication (different data transmission rates between devices).

In one configuration the invention comprises use of periodic sequences for line probing. In one configuration the invention comprises use of any sequence with good autocorrelation properties. The autocorrelation function of a sequence represented in continuous time, C(t), is given by:

$$R(t) = \int_{-\infty}^{+\infty} C(\tau)C(\tau + t)d\tau$$

One autocorrelation property is the Dirac delta function where R(t) equals infinity when t equals zero and R(t) equals zero for all other values of t. For practical finite sequences this can not be achieved. Therefore, with R(t) scaled such that the maximum value of R(t) equals one, we define good autocorrelation properties as 1−a≤R(t)≤1 for −p≤t≤+p −e≤R(t)≤+e for t≤−(p+d),t≥(p+d)

where a and e are small percentages of one, p is a percentage of the sequence symbol period and d is a small percentage of p. Bounded by these requirements the values of a, e, p and d may be selected to provide the desired sequence signal.

In one embodiment the 'e' is directly related to the period of the M-sequence. If 'e' is too large, the correlation process will result in a side lobe. Hence, a small 'e' is desired to reduce these erroneous reflections. In an embodiment 'e' is between 15% and 30% of one. In a more preferred embodiment, 'e' is between 5% and 15% of one. In a most preferred embodiment 'e' is less than 5% of one. Similarly, in an embodiment, 'd' is between about 15% and 30% of one. In a more preferred embodiment, 'd' is between about 5% and 15% of one. In a most preferred embodiment 'd' is less than about 5% of one. It is preferred to reduce 'p', however, it is contemplated that various values of 'p' between zero and sequence symbol period. Thus, it may range from zero to one. The value 'a' influences width of the autocorrelation function. In some embodiments a narrow impulse is desired. In one embodiment 'a' is between about 15% and about 30% of one. In a more preferred embodiment, 'a' is between about 5% and about 15% of one. In a most preferred embodiment 'a' is less than about 5% of one.

The requirement on R(t) in the transition region defined by d is only that the function be reasonably smooth and decreasing. Therefore, use of sequences with good autocorrelation properties closely approximating an impulse can quickly and accurately provide the channel impulse response.

The autocorrelation function of a sequence represented in discrete time, C(n), is given by $$R(n) = \sum_{k=-\infty}^{\infty} C(k)C(k+n)$$

One autocorrelation property in this case is the Kronecker delta function where R(n) equals one when n equals zero and R(n) equals zero for all other integer values of n. Again, for practical finite sequences this function can not be achieved. So, with R(n) scaled such that R(0) equals one, we define good autocorrelation properties as R(n)=1 for n=0

−e≤R(n)≤+e for n≠0 where e is a small percentage of one. In one embodiment the e is directly related to the period of the M-sequence. If e is too large, the correlation process will result in a side lobe. Hence, a small e is desired to reduce these erroneous reflections. In an embodiment e is between 15% and 30% of one. In a more preferred embodiment, e is between 5% and 15% of one. In a most preferred embodiment e is less than 5% of one.

One example of a sequence well suited to be a line probing signal comprises maximal length sequences (hereinafter M-sequences). M-sequences can be defined as a positive integer with no internal periodicity. An M-sequence can be defined by the following equation:

$$G(X) = g_m X^m + g_{m-1} X^{m-1} + g_{m-2} X^{m-2} + \ldots + g_2 X^2 + g_1 X + g_0$$

whose coefficients are binary and where each arithmetic operation is performed modulo two. When constructed as an M-sequence, the length or period of the sequence is defined as $2^m - 1$.

Sequences are desirable line probe signals for numerous reasons. One reason is that sequences can be generated by binary logic circuits, such as a scrambler as is found in most digital communication devices. Hence it is not required to include additional apparatus in the transmitter. Another desirable aspect of sequences for line probing is that they may be generated at very high speed because of the type of logic utilized to generate the sequence. Standard flip-flop and combinational type logic may be used to generate these types of sequences. Yet another desirable aspect of sequences for use in line probing, and M-sequences in particular, is that these sequences possess good autocorrelation properties that may be processed to closely approximate an impulse.

Sequences as contemplated by the invention may be implemented or created in various ways. One method of M-sequence generation comprises use of linear feedback shift registers. One example linear feedback shift register configuration comprises a Fibonacci implementation Consisting of a shift register in which a binary weighted modulo 2 sum of the taps is fed back to the input. Another example implementation comprises a Galois implementation consisting of a shift register, the contents of which are modified at every step by a binary weighted value of the output stage.

Figure 2:
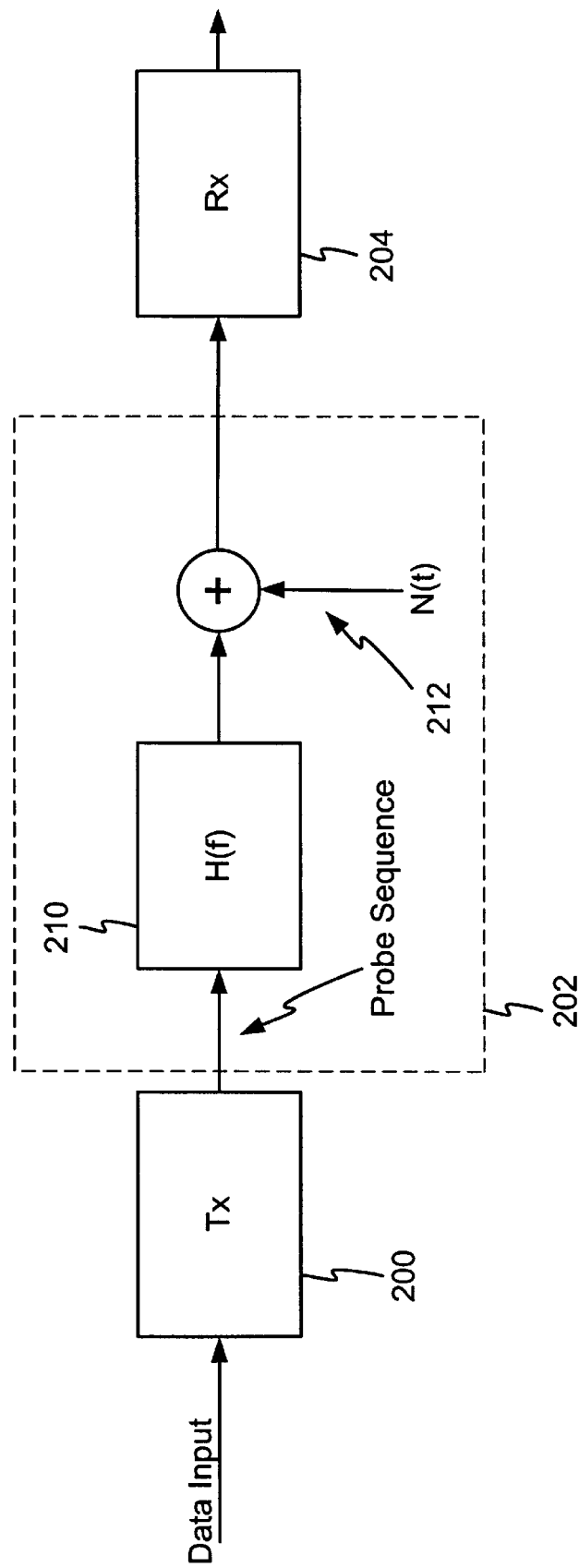
FIG. 2 is a block diagram of an example configuration of a transmitter, receiver and channel.

FIG. 2 illustrates a block diagram of an exemplary representation of a transmitter 200, a channel or line 202, and a receiver 204. The line 202 is represented from a signal response perspective as having a frequency transfer function H(f) 210 and an amount of noise, N(t) 212, introduced. It is generally understood that the line characteristics are defined by H(f) and N(t) and hence, the maximum data rate supportable by the line 202 is determined in part by H(f) 210 and N(t) 212. To evaluate the line characteristics, i.e. H(f) 210 and N(t) 212, the transmitter 200 generates and sends a sequence signal generated in accord with the teaching of the invention over the line 202 to the receiver 204. The receiver 204 or other apparatus processes the sequence signal to evaluate line characteristics H(f) 210 and N(t) 212.

It is contemplated that the invention may be used with any type transmitter 200, receiver 204, or line 202 either alone or in any combination. The transmitter may comprise any device capable of sending data or a signal over a line, circuit, channel, or transmission medium. The receiver may comprise any device capable of receiving data or a signal over a line, circuit, channel, or transmission medium and processing the received signal. The line 202 may comprise any type conductor or medium including but not limited to copper twisted pair, cable, power line, wireless optical or any other type or types of conductors.

Figure 3:
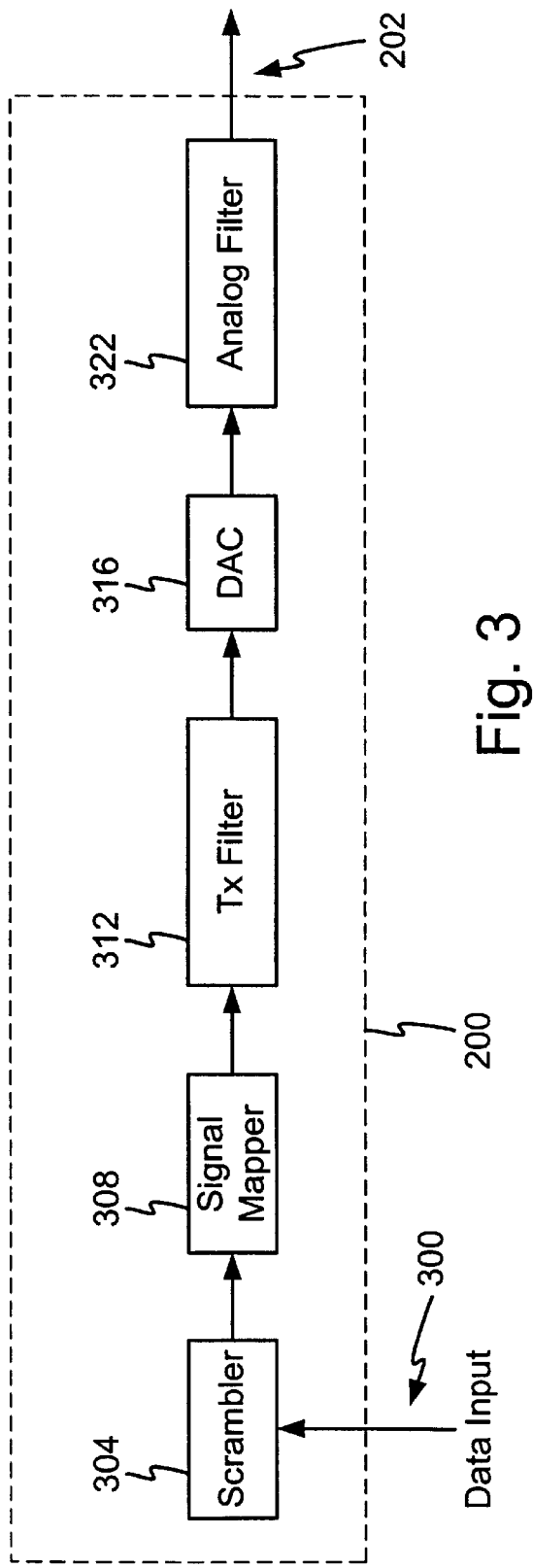
FIG. 3 is a detailed block diagram of an example embodiment of a transmitter.

FIG. 3 illustrates a more detailed block diagram of an example embodiment of the transmitter 200 shown in FIG. 2. It should be understood that this is an example embodiment provided for purposes of enablement. The invention is not limited to this example embodiment. The transmitter 200 includes a data input 300 connected to a scrambler 304. The output of the scrambler 304 feeds into a signal mapper 308, which in turn connects to a transmit filter 312. The output of the transmit filter 312 provides the filtered signal to a digital to analog converter 16, the output being connected to an analog filter 322. The output of the analog filter 322 provides a signal that is eventually coupled to or is transmitted on the line 202.

The scrambler 304 manipulates received signals to generate a generally random bit sequence in an attempt to output a data stream without long sequences of constant voltage or repeated patterns. Long consecutive bit sequences can cause wide variations in the received power level as well as difficulties for adaptive equalization and clock recovery. In one embodiment the scrambler is embodied using a shift register with feedback connections. A de-scrambler, assumed to be located in the receiver, may comprise a shift register with feed-forward connections. In one embodiment the scrambler is embodied to generate periodic sequences. The signals generated in this case are particularly well suited for line probing. The operation of the scrambler 304 in relation to the invention is described below in detail.

The signal mapper 308 transforms the digital output of the scrambler to the various signal levels that represent each of the bit values. For example, four bits of digital data may be represented as 16 PAM, i.e. any of 16 different numerical values. The 16 different values may be represented on a scale of minus one to one in increments of ⅛. The signal is ultimately scaled by an amplifier to yield a desired transmit power. In one embodiment the signal mapper 308 comprises a table lookup device or process that translates the binary input to numeric output.

The transmit filter 312 is configured to manipulate the output data to adhere to desired or required spectral requirements. For example, frequency filtering may occur to improve system performance by tailoring the frequency content of the output or it may simply be mandated by FCC or a standards organization. It may be desired to attenuate out-of-band energy while also minimally effecting in-band energy. The embodiment shown in FIG. 3 implements spectral shaping with a digital filter. The analog filter serves to reject images of the digital processing. Another embodiment eliminates the digital transmit filter. In this case, the spectral shaping is provided by the analog filter.

The digital to analog converter 316 is generally understood to convert a digital signal to an analog signal. In the embodiment shown in FIG. 3, the transmission on the line occurs in an analog format.

The analog filter 322 performs final filtering of the analog waveform to spectrally prepare the signal for transmission over the line 202. The analog filter 322 may operate similarly to the transmit filter 312 but in the analog domain.

In one embodiment of the scrambler 304, the scrambler is configured to generate periodic sequences having good autocorrelation properties. One example of a signal with good autocorrelation properties is a signal that can be made to closely approximate an impulse. As can be understood, an impulse is a signal that, within a very short interval of time, assumes a substantially non-zero value while being approximately zero outside this time interval. An impulse response characterizing the line/channel is one desirable outcome of line probing. It is contemplated that a device other than a scrambler may be configured to generate the periodic sequences used for line probing. Any device or configuration of hardware and/or software may be adopted for use for generating sequence signals without departing from the scope of the invention.

Figure 4:
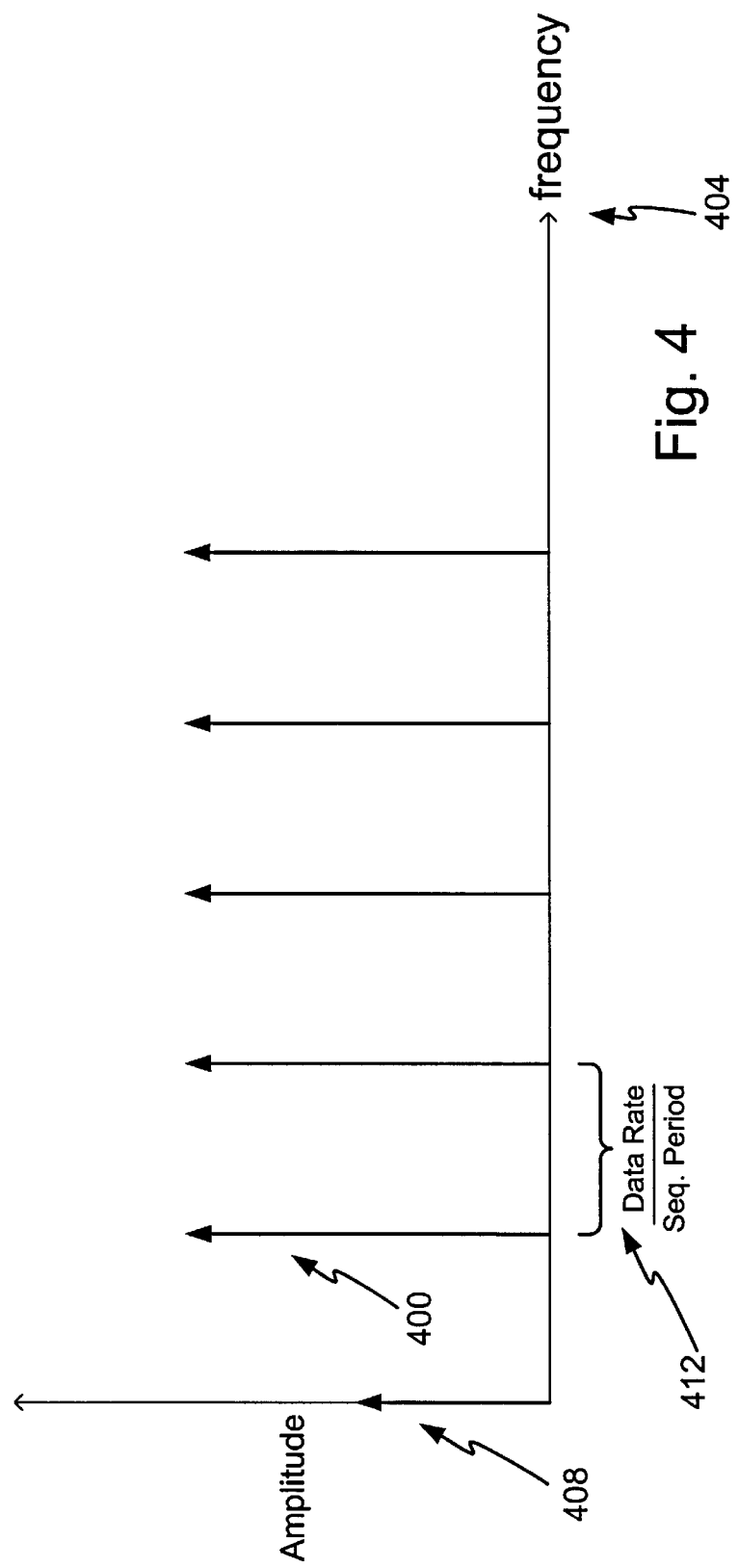
FIG. 4 is a plot of the frequency components of a line probe sequence.

FIG. 4 illustrates a plot of frequency components 400 of a periodic sequence on a graph of frequency 404 and spectral amplitude 408. The frequency domain sequence 400 hence appears as an impulse signal having period 412 of the symbol rate divided by sequence period. This representation can be arrived at by performing the Fourier transform (FT) on the sequence signal. This representation of the sequence can be processed by tone detecting receivers. This capability is desirable to maintain backwards capability with other systems that operated as tone based systems.

In one configuration, the scrambler 304 or other device with similar capabilities generates sequence defined by varying the polynomial of the sequence generator to provide different line probe signals. In another configuration the polynomial is selected to maximize the period of the sequence, such as to create an M-sequence. As described above, the period of a length maximized sequence is defined as $2^m - 1$ where m is the number of stages of the shift registers used to generate the sequence.

By varying the number of stages m, the period is controlled. Various advantages may be gained by varying the period of the sequence. For example, one advantage of increasing the period of the sequence when used according to the invention for line probing is a spreading of the noise, represented in FIG. 2 by N(t), over the period of the sequence. Spreading the noise reduces the effect of the noise components that become part of the probing signal during transmission of the probing signal through the line. This improves the accuracy of the line characterization. Another advantage of increasing the period of the sequence is that the line probing can provide longer impulse response. Yet another advantage of increasing the period of the sequence is that the probing is based on more probing tones with finer frequency spacing.

An advantage of a shorter period generated by using a smaller m value is that the sequence may be generated and analyzed more rapidly. This speeds the line probe process. Another advantage of shorter period sequences is a lowering of the computational complexity in the receiver.

In general, numerous M-sequences exist with periods depending on the number of stages in the shift register. There is at least one M-sequence for every integer greater than one where this integer represents the number of stages of the shift register. If more than one M-sequence exists for a given number of stages then the sequences are distinguished by the non-zero taps of the shift register. This is designated by the polynomial representation. In one embodiment of the invention, a sequence having a period of 31 is generated by a first terminal, such as a central office, and adopted for use as a line probing sequence. One polynomial defined by a period of 31 is:

$$s(n)=s(n-2)\oplus s(n-5)\oplus f(n)$$

where f(n) is the logical ones input to the scrambler, s(n−k) is the tap point after the k-th delay element in the scrambler and $\oplus$ is modulo-2 addition.

Another example polynomial that may be generated by a first terminal, such as a central office, and defined by a period equal to 63 is:

$$s(n)=s(n-1)\oplus s(n-6)\oplus f(n)$$

Another example polynomial that may be generated by a first terminal, such as a central office, and defined by a period equal to 127 is:

$$s(n)=s(n-3)\oplus s(n-7)\oplus f(n)$$

another example polynomial that may be generated by a first terminal, such as a central office, and defined by a period equal to 255 is:

$$s(n)=s(n-2)\oplus s(n-3)\oplus s(n-4)\oplus s(n-8)\oplus f(n)$$

In another embodiment of the invention, a sequence having a period of 31 may be generated by a second terminal, such as a remote terminal, and adopted for use as a line probing sequence. One polynomial defined by a period of 31 is:

$$s(n)=s(n-3)\oplus s(n-5)\oplus f(n)$$

where f(n) is the logical ones input to the scrambler, s(n−k) is the tap point after the k-th delay element in the scrambler and $\oplus$ is modulo-2 addition.

Another example polynomial that may be generated by a second terminal, such as a remote terminal, and defined by a period equal to 63 is:

$$s(n)=s(n-5)\oplus s(n-6)\oplus f(n)$$

Another example polynomial that may be generated by a second terminal, such as a remote terminal, and defined by a period equal to 127 is:

$$s(n)=s(n-4)\oplus s(n-7)\oplus f(n)$$

Another example polynomial that may be generated by a second terminal, such as a remote terminal, and defined by a period equal to 255 is:

$$s(n)=s(n-4)\oplus s(n-5)\oplus s(n-6)\oplus s(n-8)\oplus f(n)$$

An example polynomial, not associated with an m-sequence, but producing a viable probe signal is defined by:

$$s(n)=s(n-1)\oplus f(n)$$

Using the sequence signals, generated by the scrambler or any other device capable of generating a corresponding sequence signal, as a line probe signal, provides advantages over the prior art signals. One such advantage comprises faster line probe process because the data rate for the line can be calculated using trusted mathematical principles that depends on the signal to noise ratio as a function of frequency. Hence the periodic sequence can be sent and a single calculation be performed instead of having to send a first tone and perform a calculation, send a second tone and perform a calculation, send a third tone and perform a calculation and so on until an acceptable data rate is determined.

Another advantage associated with the use of sequences having desirable autocorrelation properties comprises an ability to more accurately process the received signal to arrive at a more accurate calculation of the line characteristics, such as the maximum data rate for the line. In contrast to the inaccurate sequential search operations of the prior art, the sequence signals of the present invention allow for use of mathematical principles and equations to arrive at an accurate and calculated result. Yet another advantage of the invention is that the calculation of the signal component of the signal to noise ratio is done extremely quickly and accurately.

Figure 5:
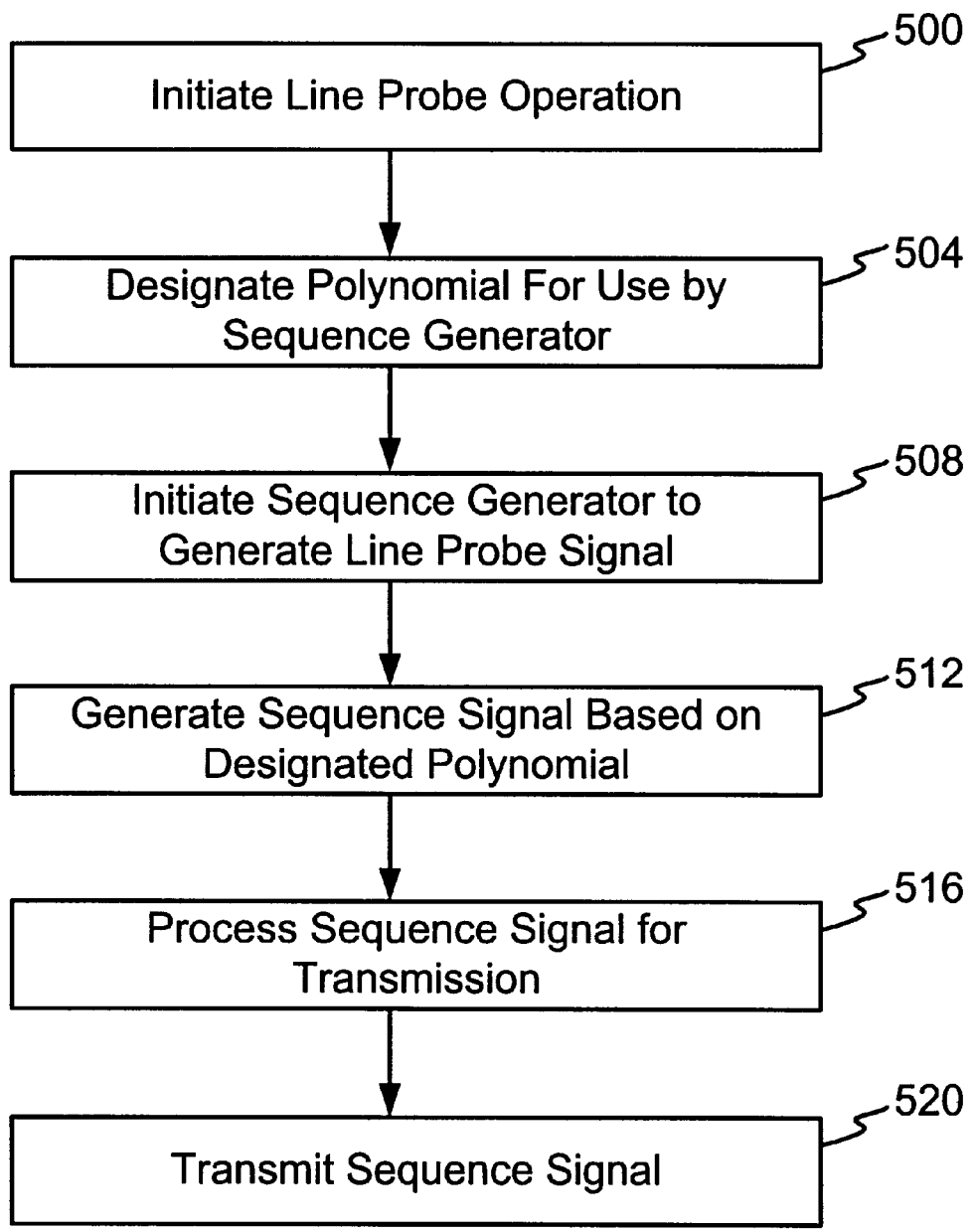
FIG. 5 is a flow diagram of an example method of generating a line probe sequence.

FIG. 5 illustrates a flow diagram of an example method of generating a sequence signal according to one example embodiment of the invention. Other methods of sequence generation are possible and within the scope of the invention. At a step 500, the method initiates a line probe operation. In one example method of operation the line probe operation occurs at the initialization operation of a communication device, such as a DSL communication device, to determine the bit rate at which the line will support communication. One example of a communication device comprises a communication device operating under the G.shdsl (also known as G.991.2) standard. In another method of operation, the line probe occurs every time the communication device initiates operation or periodically during operation to evaluate the channel.

Next, at a step 504, a polynomial is designated for use by the sequence generator. An M-sequence may be designated or generated based on a polynomial defining the sequence.

At a step 508, the method initiates a sequence generator, such as a scrambler, to generate a line probe sequence. Various different types of sequence signals having good autocorrelation properties may be used as the line probe sequence. One example sequence is an M-sequence. The text Introduction to Spread Spectrum Communications written by R. Peterson, R. Ziemer, and D. Borth from Prentice-Hall, Inc. (1995), which is incorporated by reference herein, provides some discussion of M-sequences in general. Another example sequence comprises an augmented M-sequence where the period of the sequence is extended by one to be a power of 2. Yet another type of sequence that may be utilized comprises a Barker Code type sequence. Yet another type of sequence that may be utilized comprises a Gold code type sequence. Yet another type of sequence that may be utilized comprises a Kasami code type sequence. It is contemplated that any type periodic sequence having good autocorrelation properties may be used.

Thereafter, at a step 512, the system generates the desired sequence, based on the polynomial or any other designation or information, provided to the sequence generator.

After the sequence is generated, the operation progresses to a step 516 and the system processes the sequence signal for transmission over the line. Various processing may occur as is known in the art to achieve desired transmission. At a step 520, the operation transmits the sequence signal.

In one embodiment, the signal is processed to determine the data rate for the line. The data rate may be selected, determined, or calculated to be the maximum data rate that the line will support, a data rate with margin to reduce errors, or any data rate desired. In one embodiment the data rate is the maximum data rate possible for the line, taking into account factors such as acceptable signal to noise ratios (SNR) for a given BER and desired margin.

It is contemplated that the line probe sequence may be generated, transmitted and processed at start-up of the first communication session, at start-up of every communication session, periodically at start-up of various sessions, or intermittently during the communication session.

Figure 6A:
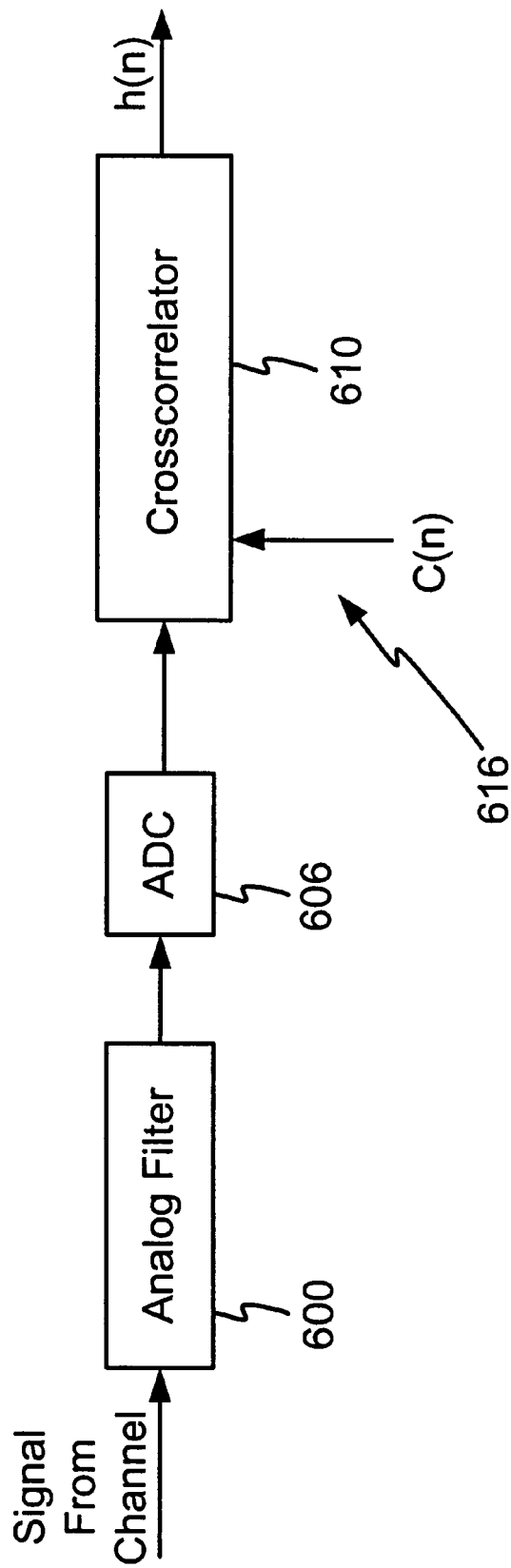
FIG. 6A is a block diagram of an example embodiment of a receiver.

FIG. 6A illustrates a block diagram of an example embodiment of a receiver. As is understood by those of ordinary skill in the art, various components have been left out so as to not obscure the relevant aspects of the invention. As shown, the receiver includes an analog filter 600 connected to an analog to digital converter 606. The output of the analog to digital converter 606 connects to a crosscorrelator 610. Mathematically, the crosscorrelator is realizing the following function:

$$h(n) = \sum_k C(k)X(k+n)$$

where X(n) is the sum of the transmitted line probe sequence C(n) plus any additive noise and crosstalk. In one embodiment the crosscorrelator 610 is embodied using a sliding tap delay line. There are numerous ways to implement the crosscorrelator 610 and this is but one example embodiment. The correlator 610 may be embodied in hardware, or software, or a combination of the two. Indeed, it is contemplated that an analog implementation of the crosscorrelator maybe preferred particularly in high rate applications. In this implementation analog to digital converter 606 maybe omitted. In the sliding tap delay line method the taps are C(n). The crosscorrelator 610 receives a signal C(n) 616. The output of the crosscorrelator 610 comprises a signal h(n).

The analog filter 600 performs filtering of the signal in the analog domain to filter out unwanted noise on the received signal that is outside of the desired frequency band and to provide only desired frequency components to the other aspects of the receiver. The analog to digital converter 606 converts the analog signal to the digital format.

The crosscorrelator 610 processes the signal C(n) and the received signal over the period of the sequence to obtain an estimate of the impulse response of the channel. This may later be transformed into the frequency domain to be used in the SNR calculation. The signal C(n) comprises a receiver generated copy of the sequence that was sent out over the line as the line probe sequence. The line probe sequence and the signal C(n) are correlated together to generate a signal generally equivalent to a signal generated by sending an impulse through the channel. Thus, an estimate of the channel impulse response is the output of the correlator. This is a time domain signal that may be transformed to the frequency domain, for example with a Discrete Fourier Transform (DFT), to obtain the power spectral density. In one embodiment, a fast Fourier Transform (FFT) is performed to obtain the power spectral density One example method of cross correlation is achieved with the use of a sliding tap delay line. The sliding tapped delay may comprise a finite impulse response digital filter having a length equal to a multiple of the period of the sequence. The multiple may depend on whether over-sampling occurs in the receiver. The coefficients or taps in the finite impulse response filter may correspond to the bit values in one period of the sequence. In one particular embodiment the sliding tap delay has 63 taps. Any number of taps may be adopted for use.

Figure 6B:
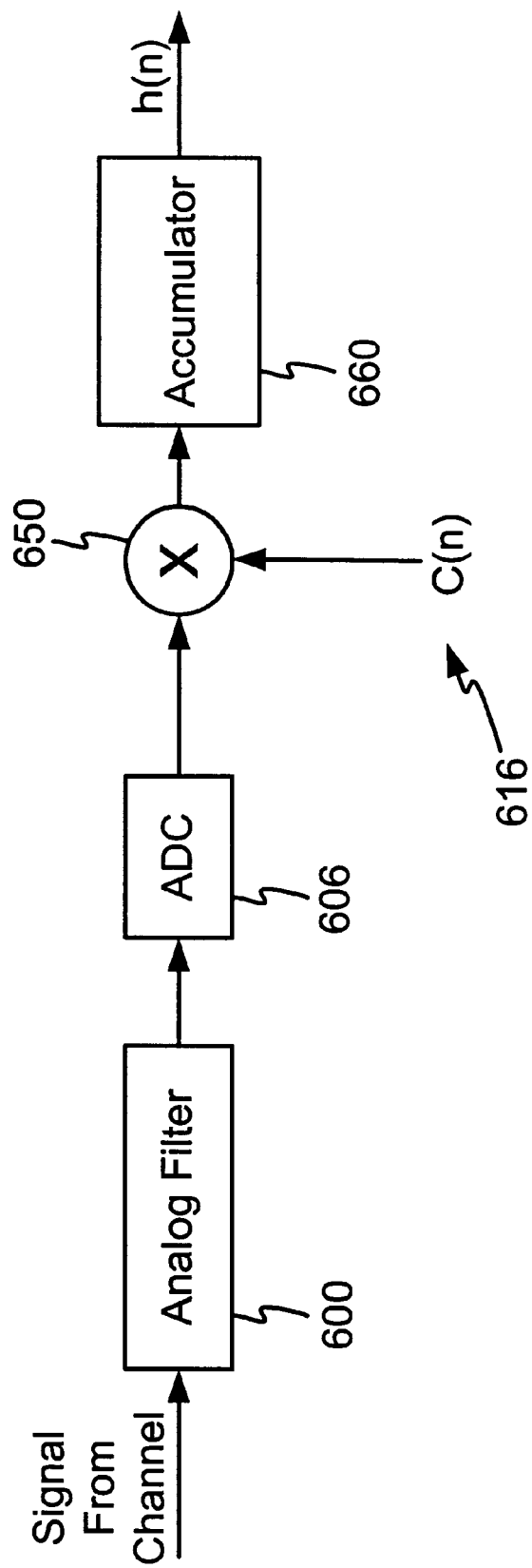
FIG. 6B is a block diagram of an alternative embodiment of a receiver.

In the embodiment shown in FIG. 6B, the receiver is embodied with a configuration to approximate an integration of the received signal multiplied by the sequence signal C(n). The output of the analog filter 600 feeds into an analog to digital converter 606. The output of the analog to digital converter 606 connects to a multiplier 650. The multiplier 650 receives as another input the signal C(n) 616. The multiplier 650 multiplies the received sequence with the signal C(n) 616 to generate an output that is provided to an accumulator 660. The accumulator 660 comprises a device configured to generate a running summation of the received signals. In F general, the output of the accumulator 660 is generally similar to a first order approximation to an integral over the period of time that the accumulator operates. Thus, the accumulator 660, upon receipt of a number, stores the number. Then, upon receipt of another number, the accumulator 660 adds the first number to the second number and stores the result. The process continues in this manner. In one embodiment the accumulator comprises a summing operation and a register to store the accumulating result.

The output of the cross correlation process is an estimate of the impulse response. This is a time domain signal. Transforming the output into the frequency domain provides the power spectral density. There are a number of ways to transform the signal into the frequency domain, one being a DFT. The output of the cross correlation comprises an estimate of the impulse response or channel response. Transforming this signal into the frequency domain yields the frequency spectrum, including all channel effects, of the sequence signal transmitted over the line. This channel response can then be used to determine the ideal data rate based on a target signal to noise ratio (SNR).

Figure 7:
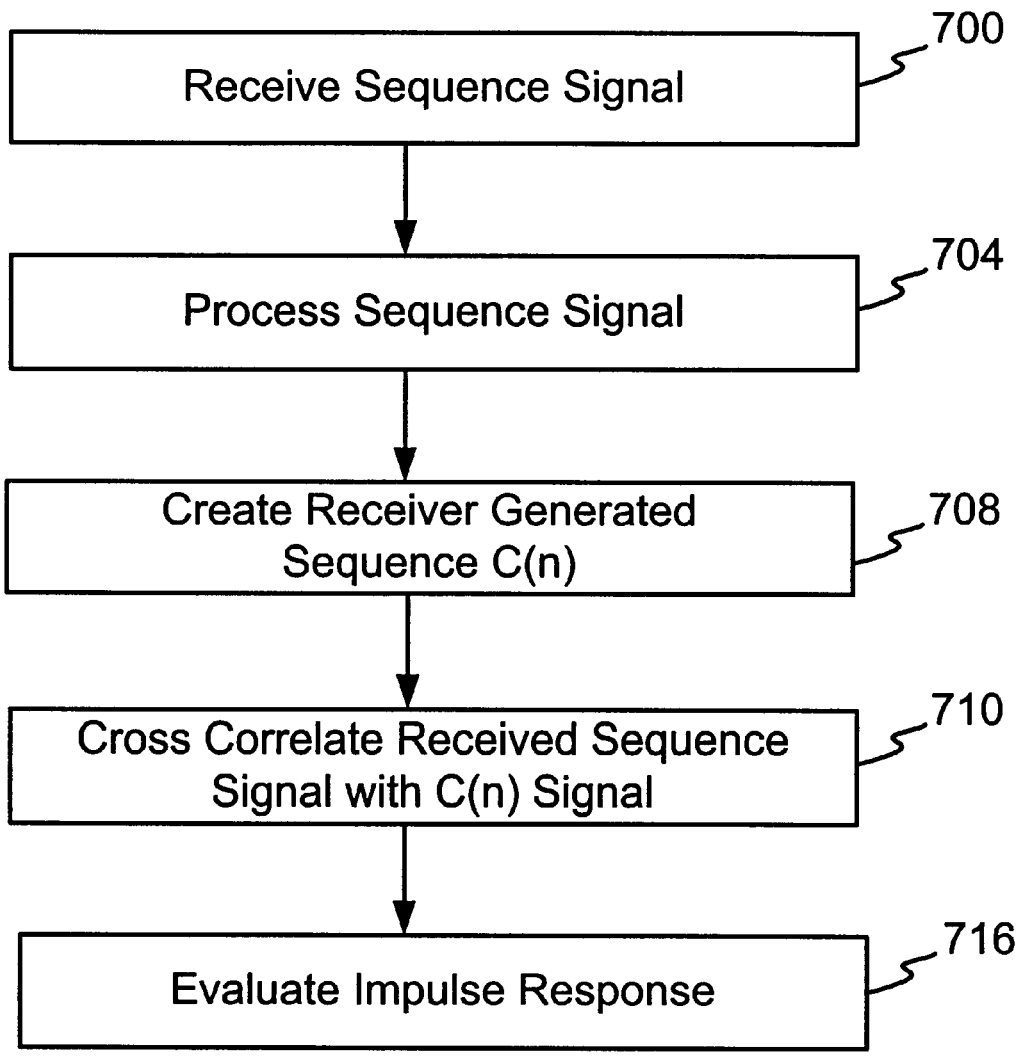
FIG. 7 is a flow diagram of an example method of processing a line probe sequence.

FIG. 7 illustrates a flow chart of an example method of receiver operation. This is but one example method of operation. It is contemplated that other methods of operation may be embodied without departing from the scope of the invention. At a step 700 the receiver receives a sequence processed through a channel, such as a sequence used for line probing. One such example sequence comprises an M-sequence. Next, at a step 704, the signal is processed. One method of processing comprises filtering and conversion from the analog to digital domain. Other types of processing may be performed to execute the teachings of the invention.

At a step 708, the receiver creates a receiver generated sequence C(n). It is contemplated that the sequence C(n) is the same sequence that was initially transmitted through the line. In general, it is conceivable to use a different sequence in the cross correlation to estimate the impulse response, but for the M-sequence it is appropriate to use the same sequence. Next, at a step 710, the receiver crosscorrelates the received sequence signal with C(n). In one embodiment the cross correlation process creates an output that represents a signal generally equivalent to an impulse having been transmitted through the channel.

At a step 716, the receiver or other component analyzes the signal representing the channel response to an impulse signal. The analysis occurs to determine the desired or maximum bit rate or data transmission rate for the line. One example method of calculation is provided below. This is but one example method of operation for receiving and processing the signal. It is contemplated that other methods may be adopted without departing from the scope of the invention.

Figure 8:
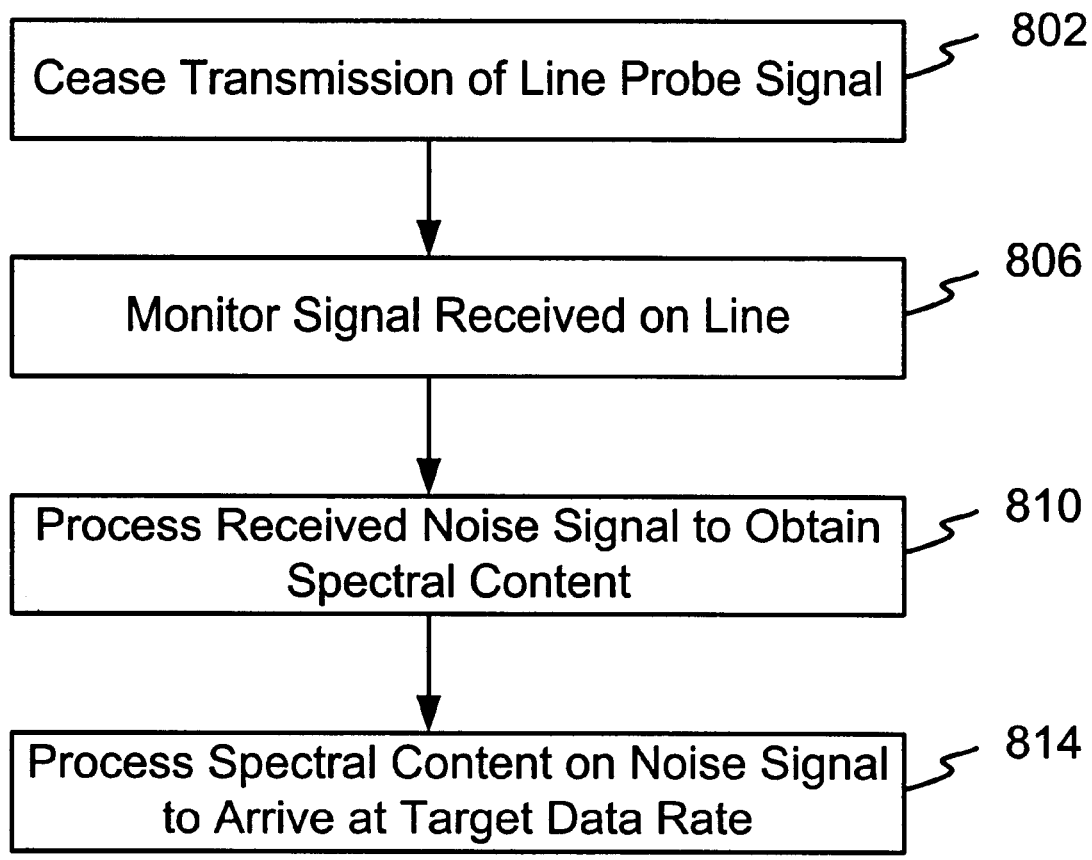
FIG. 8 is a flow diagram of an example method of monitoring for line noise.

FIG. 8 illustrates an example method of operation for measuring a noise value and calculating its power spectral density. At a step 802, the operation ceases transmission of the line probe sequence signal. Also, the receiving terminal is prevented from transmitting a signal. This results in no signal being transmitted over the line. Next, at a step 806, the operation monitors the signal received on the line. In this step the receiver receives any noise signals on the line that results from line noise and/or crosstalk. This reception occurs without interference from transmitted signals. One example of noise comprises crosstalk. By not transmitting a signal on the receiving side, line noise is isolated from a potential near end echo. At a step 810, the operation processes the received noise signal to obtain the spectral content of the signal. In one embodiment this occurs by a DFT operation, although in other embodiments it is contemplated that the spectral content may be arrived at by other methods. At a step 814, the spectral content of the noise signal may be further processed to arrive at a target data rate.

In one example embodiment the bit rate for the line may be calculated based on the principles of Shannon's Theory that define maximum bandwidth for a line. Working from the following equation:

$$\frac{capacity}{bandwidth} = 10 \log_{10}\left(1 + \frac{\int p(f)df}{\int n(f)df}\right)$$

p(f) is the signal power spectral density and n(f) is the noise power spectral density. This equation may be represented another way as:

$$\frac{capacity}{bandwidth} = 10 \log_{10}(1 + SNR(f))$$

In this equation the integral (over frequency values) of the power spectral density of the signal divided by the integral (over frequency values) of the noise signal is reduced to the SNR values represented as a function of frequency. The capacity variable is defined in bits per second when the logarithm is base two. The bandwidth variable is defined in hertz.

It can also be shown that the power spectral density P(f) can be represented as:

$$P(f) = T(f) \times |H(f)|^2$$

where T(f) is the transmitted signal and H(f) is the channel characterization. Typically, T(f) is constant in frequency so that it suffices to have knowledge of only H(f). The channel characterization may be considered the transfer function at issue because from this channel characterization the maximum or desired bit rate may be calculated.

Thus, the capacity divided by bandwidth can be considered representative of the SNR. Next, the total SNR is approximated as:

$$SNR_{total} = \frac{capacity}{bandwidth} = \sum_{k=0}^{Nbin-1} 10 \log_{10}\left[\frac{P_k}{N_k}\right]$$

where $N_{bin}$ is the number of frequency bands, or equivalently, bins. The variable $P_k$ represents the channel response in a narrow frequency band. The location of the band is indicated by the normalized variable k. The actual frequency depends on the bands computed and the sampling rate. $P_k$ can be arrived at by the use of sequences in accordance with the invention. The N(k) is the noise measurement in the frequency domain. The noise measurement represents the frequency content of the noise in the k-th frequency band or bin. It consists of crosstalk coupled into the line.

Turning to an evaluation of the maximum achievable data rate, it is desired to determine a target SNR for an encoded signal. The target can be defined as:

target=$SNR_{uncoded}$+margin−coding gain $SNR_{uncoded}$ is the required SNR to achieve a desired bit error rate (BER) in an un-coded system. Hence the BER may be considered to establish the desired target. The margin is the amount of buffer to be included into the target SNR to offset any uncertainties that may arise in an actual deployment. It is assumed that the design is not intended to be operated at the edge of the maximum bit rate and hence a margin is added to the minimum SNR to achieve desired operation even if line characteristics change slightly during operation, such as for example from thermal changes.

The coding gain is defined as the reduction of the required SNR as compared to an un-coded system such that the coded and un-coded systems yield the same BER. One method of coding that results in coding gain comprises trellis coding. Another method of coding comprises turbo codes, low-density parity check codes, concatenated codes, convolutional codes or any other coding scheme presently known or developed in the future. It should be noted that coding is not required for operation of the present invention and it is discussed for purposes of understanding. Systems may optionally include coding and hence may enjoy a coding gain. Likewise, a margin need not be incorporated into the system but is included to illustrate a stable and reliable system.

Next, it is desired to solve for the largest frequency band such that the computed SNR, based on measuring P(f) and N(f), is greater than the target value. This in turn gives the maximum achievable data rate over the channel for the given technology. In one embodiment it is desired to maximize the number of frequency bands. This is especially desirable if there are numerous bridge taps on the line. The number of frequency bands may however be limited by the complexity and availability of computing power. To determine the maximum supportable data rate the SNR equation is re-expressed as a partial sum. This new equation is provided below.

$$SNR(m) = \sum_{k=0}^{m-1} 10 \log_{10}\left[\frac{P_k}{N_k}\right] \text{ for } m = 1 \ldots Nbin$$

The next step in the process is to find the largest index in such that SNR(m)>target. This identified index is denoted as $M_{opt}$ and is relatable to the data rate. It is also possible to refine the data rate estimation by interpolation around the point where the computed SNR falls below the target. This in effect refines $M_{opt}$ to be a real number as opposed to an integer.

Figure 9:
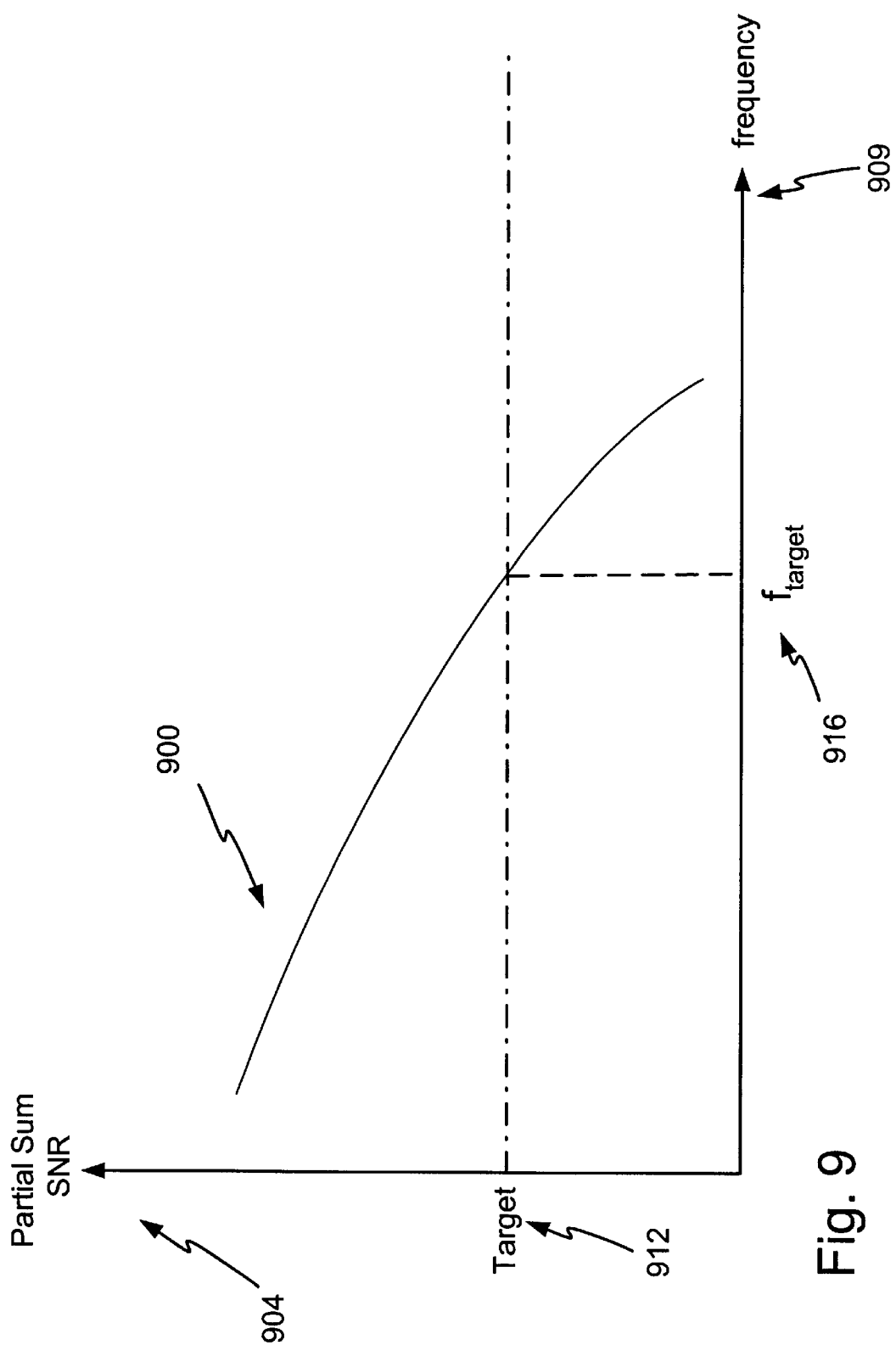
FIG. 9 is a plot of the line bandwidth on a graph of signal to noise ratio versus data rate.

FIG. 9 is a plot of the partial sum SNR 904 verses data rate 909. A target SNR 912 is represented on the SNR axis 904 as a value representing a SNR below which the received signal should not fall. From this graph, the location where the target intersects the signal, is noted as $f_{target}$ 916. In this example calculation $f_{target}$ comprises the maximum frequency at which data may be transmitted on the line while still maintaining the desired BER performance associated with the target SNR. As noted, a further refinement can be made by interpolating around the point where the computed SNR crosses over the target.

Mathematically, $M_{opt}$ is related to the data rate as:

$$f_{target} = M_{opt} \times \Delta$$

where $\Delta$ is the spacing between frequencies. Stated another way, $\Delta$ is the BIN spacing. Any range of frequencies may be selected for use. In one embodiment the frequency spacing corresponds to data rates between 192 Kb/s and 2320 Kb/s. The BIN spacing $\Delta$ may be expressed as:

$$\Delta = \frac{f_{max}}{\# \text{ of BINS}}$$

where $f_{max}$ is the maximum observable frequency by the receiver.

The received sequence signal provides the $P_k$ signal or values. In one exemplary method of operation, $P_k$ may be calculated by computing h(n) with the use of a cross correlation process. Thereafter, the Discrete Fourier transform (DFT) function is performed on the h(n) sequence to compute the $P_k$ values. The number of points in the DFT is equivalent to the number of bins, Nbin. This exemplary method may be adopted for a short sequence, such as one having a period of 63 data points. In an alternative embodiment, a period of $2^{23}-1$ is selected and the FFT function is performed on the received signal to determine $P_k$. This method is ideal for sequences with long periods. It is contemplated that other methods of computation may be adopted for use. It should be noted that h(n) is a discrete time domain signal which is transformed into the frequency domain to yield $P_k$.

The $N_k$ values are provided by noise measurements represented in the frequency domain. To calculate noise $N_k$ in this example method of processing, the FFT is performed on the received signal when no signal is being transmitted from either the near or far end. The index k represents the BIN number. In an alternative embodiment, a band pass filtering process may be used instead of a FFT function. The FFT function provides a frequency representation of the noise signal received on the line.

Figure 10:
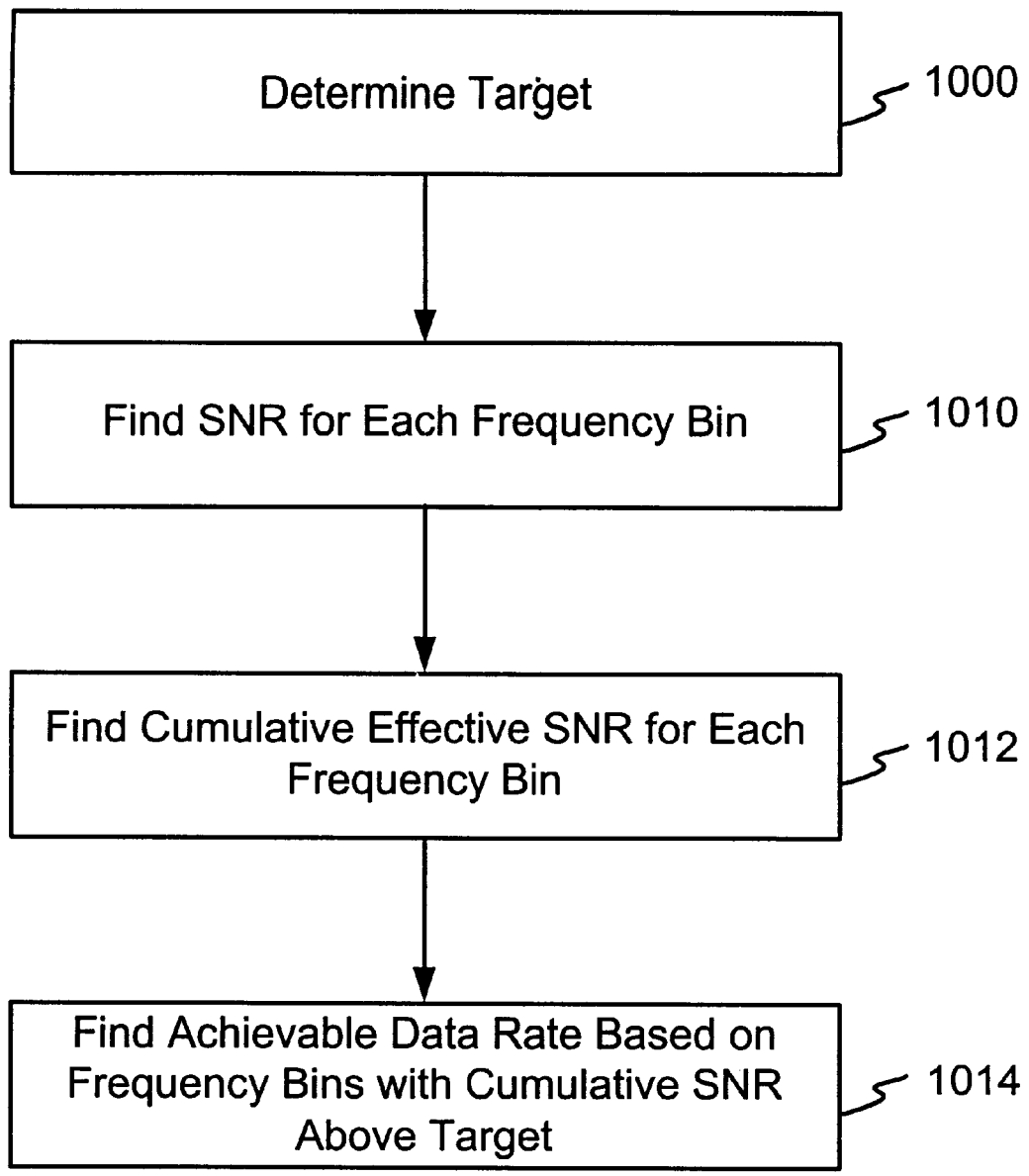
FIG. 10 is a flow diagram of an example method of determining an achievable data rate based on line probing information.

FIG. 10 illustrates a flow chart of an example method for determining achievable data rate based on probing information. This is but one example method. It is contemplated that other methods of operation may be embodied without departing from the scope of the invention. The method may be executed by a hardware configuration, a software configuration, or a combination of hardware and software. In one embodiment the method of processing described below is realized using a microprocessor with associated software code. As can be understood, it is desirable to utilize a microprocessor during the line probe process because during the line probe process the communication device may not be receiveing data and thus the processor would have available processing resources.

In reference to FIG. 10, at a step 1000 the target is determined. The target can be determined based on the SNR required for the modulation scheme used and the desired excess margin. For example, for the modulation used in G.shdsl, 16 point trellis coded PAM, it would be appropriate to determine the target as:

target=required SNR at 8 PAM+excess margin+implementation loss−coding gain

Typical values for the G.shdsl (Annex A) standard may be require a SNR at 8PAM equal to 27.7 dB, excess margin equal to 5 dB, implementation loss equal to 1.6, and coding gain equal to 5.1 dB. These typical values yield 29.2 dB as a value for target for the G.shdsl (Annex A) standard. Other values may apply to other communication systems or standards.

At step 1010 the SNR is found for each frequency bin. The SNR is found as the ratio of the estimated signal level and the estimated noise level. In step 1012 the cumulative effective SNR is found for each frequency bin by summing up the logarithm of the SNR for the frequency bins below it in frequency according to:

$$SNR(m) = \sum_{k=0}^{m-1} 10 \log_{10}\left[\frac{P_k}{N_k}\right] \text{ for } m = 1 \ldots Nbin.$$

At step 1014 the achievable bit rate or data rate is determined based on which frequency bins result in the cumulative effective SNR being above the target. For example, for the G.shdsl standard it may be appropriate to find the maximum m such that SNR(m) is above the target. This yields the maximum symbol rate with sufficient margin. For the G.shdsl standard, the maximum data rate for the line would then be about three times the maximum symbol rate, since each symbol represents three data bits.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

We claim:

1. A method for processing a line probe signal to determine a data communication rate for a data transmission line, the method comprising;

receiving a sequence signal over the data transmission line wherein the line probe signal comprises a maximal length sequence signal;

filtering the received sequence signal;

crosscorrelating the filtered sequence signal to obtain a signal generally similar to the line's impulse response;

establishing a target signal to noise ratio for data transmission over the line;

computing a rate of data transmission, based on the signal generally similar to the line's impulse response, that yields a signal to noise ratio not less than the target signal to noise ratio.

2. The method of claim 1, wherein the target signal to noise ratio comprises a signal to noise ratio allowed by a digital subscriber line standard plus margin minus coding gain.

3. The method of claim 1, wherein computing the rate of data transmission comprises:

converting the sequence signal to the frequency domain;

calculating a signal to noise ratio at one or more frequency bins;

summing logarithmic values of the signal to noise ratio at the one or more frequency bins to generate an actual signal to noise ratio; and comparing the actual signal to noise ratio to a target signal to noise ratio to determine at which of the one or more frequency bins the actual signal to noise ratio drops below the target signal to noise ratio.

4. The method of claim 1, wherein crosscorrelating comprises crosscorrelating using a sliding tap delay line.

5. A method for processing a line probe signal comprising:
receiving a line probe signal;
correlating the line probe signal to obtain channel characteristics;
establishing a maximum acceptable error rate;
computing a transmission rate such that at the computed transmission rate an actual error rate will be less than the maximum acceptable error rate, wherein the error rate is defined as the desired uncoded signal to noise ratio plus a desired margin minus a coding gain.

6. The method of claim 5, further including monitoring noise on the line to determine the amount of noise on the line and including the amount of noise on the line when correlating.

7. The method of claim 6, wherein monitoring noise on the line comprises monitoring the line for noise when no signal is being transmitted.

8. The method of claim 5, wherein a maximum acceptable error rate is defined by the G.shdsl standard.

9. The method of claim 5, wherein the line probe signal comprises a sequence signal.

10. The method of claim 5, wherein the line probe signal comprises a maximal length sequence signal.

11. A method for processing a line probe signal comprising:
receiving a line probe signal;
correlating the line probe signal to obtain channel characteristics;
establishing a maximum acceptable error rate; and
computing a transmission rate such that at the computed transmission rate an actual error rate will be less than the maximum acceptable error rate, wherein correlating utilizes a sliding tap delay line.

12. The method of claim 7, wherein the noise characteristics comprises crosstalk.

13. The method of claim 5, wherein the transmission rate comprises a desired data transmission rate for the line.

14. A method for processing a signal to determine a data transmission rate for a line, the method comprising:
receiving a sequence signal sent from a remote location over the line being probed, the sequence signal being comprised of frequency bins;
receiving noise on the line;
converting the sequence signal to the frequency domain and converting the noise on the line to the frequency domain;
calculating a signal to noise ratio based on the received sequence signal and the noise on the line at one or more frequency bins;
summing logarithmic values of the signal to noise ratio at one or more frequency bins to generate an actual signal to noise ratio; and
comparing the actual signal to noise ratio to a target signal to noise ratio to determine at which of the one or more frequency bins the actual signal to noise ratio drops below the target signal to noise ratio.

15. The method of claim 14, wherein the signal to noise ratio comprises a ratio of estimated signal level to the estimated noise level.

16. The method of claim 14, wherein the target signal to noise ratio comprises a minimum acceptable signal to noise ratio.

17. The method of claim 14, wherein the sequence signal comprises a maximal length sequence signal.

18. The method of claim 17, wherein the maximal length sequence signal has a period selected from the group of 31, 63, 127, or 255.

19. A system for processing a received line probe signal, the received line probe signal having been transmitted through a line and having been affected by the characteristics of the line during transmission, the system comprising:
a filter configured to isolate a desired frequency portion of the line probe signal;
an analog to digital converter configured to convert the filtered line probe signal to a digital signal;
a crosscorrelator configured to crosscorrelate the digital signal from the analog to digital converter with a second signal, the second signal being generally identical to the line probe signal prior to transmission through the line; and
a processor in communication with the crosscorrelator, the processor configured to process the crosscorrelator output to determine a maximum acceptable data rate for the line.

20. The system of claim 19, wherein the filter comprises a filter configured to isolate a signal having a frequency range between 192,000 bits/second and 2,320,000 bits/second.

21. The system of claim 19, wherein the processor is configured to perform a discrete Fourier transform.

22. The system of claim 21, wherein the processor is further configured to process noise information to determine a maximum acceptable data rate.

23. A line probe system configured to process a signal representing a line's impulse response at a plurality of frequency bins to determine a data transmission rate for a line comprising:
a time domain to frequency domain converter configured to convert the impulse response to the frequency domain and to convert the noise on the line to the frequency domain, thereby providing noise information and impulse response information at one or more frequency bins;
a signal to noise ratio calculation unit configured to calculate the signal to noise ratio at one or more frequency bins;
a summation unit configured to sum the logarithmic values of the signal to noise ratio at two or more frequency bins; and
a comparator to compare the summation unit output to a target signal to noise ratio.

24. The system of claim 23, wherein the target signal to noise ratio comprises a signal to noise ratio determined in part by a communication standard.

25. The system of claim 23, wherein the comparator determines at what frequency bin the summation unit output falls below the target signal to noise ratio.

26. The system of claim 23, wherein the comparator output determines a data transmission rate the line will support.

27. A computer program product comprising a computer useable medium having computer program logic recorded thereon for processing a sequence signal received over a line comprising:

computer program code logic configured to processes a received sequence signal to generate an impulse response signal;

computer program code logic configured to receive noise data and a target signal to noise ratio;

computer program code logic configured to process the sequence signal and the noise data to generate a running summation of the signal to noise ratio at two or more frequency bins;

computer program code logic configured to identify at which of the two or more frequency bins the running summation of the signal to noise ratio falls below the target signal to noise ratio.

28. The computer program product of claim 27, wherein the sequence signal has a period of 31, 63, 127, or 255.

29. The computer program product of claim 27, wherein the sequence signal comprises a maximal length sequence.

30. The computer program product of claim 27, wherein the identified frequency bin comprises about the maximum frequency at which the line carry data.

31. A system for processing a line probe signal to determine a transmission rate that results in an error rate during data transmission of less than or equal to an acceptable error rate:

means for receiving a line probe signal;

means for crosscorrelating the line probe signal to obtain channel characteristics;

means for computing a transmission rate such that at the computed transmission rate the error rate during data transmission will be less than or equal to the acceptable error rate.

32. The system of claim 31, wherein means for receiving a line probe signal further comprises means for receiving noise on the line, and means for computing comprises:

means for converting the line probe signal to the frequency domain and converting noise on the line to the frequency domain;

means for calculating a signal to noise ratio at one or more frequency bins based on the output of the means for converting;

means for summing logarithmic values of the signal to noise ratio at one or more frequency bins to generate an actual signal to noise ratio; and means for comparing the actual signal to noise ratio to a target signal to noise ratio to determine at which of the one or more frequency bins the actual signal to noise ratio drops below the target signal to noise ratio.

33. The system of claim 31, wherein the means for computing comprises a processor configured to execute software code.

34. A method for processing a line probe signal comprising:

receiving a line probe signal at a first location over a transmission medium;

executing first processing at the first location on the received line probe signal to obtain information regarding the transmission medium;

sending the information to a second location; and executing second processing on the information at the second location to determine a transmission rate for the transmission medium, wherein executing first processing at the first location on the received line probe signal to obtain information regarding the transmission medium comprises crosscorrelating the received signal to obtain information representing the transmission mediums impulse response.

35. The method of claim 34, further including transmitting data to the first location at or below the transmission rate that was calculated at the second location.

36. The method of claim 34, wherein the second location transmits the line probe to the first location over the transmission medium.

37. The method of claim 34, wherein the second location comprises a location having apparatus configured to processes the information from the first location and additional information from a plurality of other locations.

38. A method for processing a line probe signal comprising:

receiving a line probe signal at a first location over a transmission medium;

executing first processing at the first location on the received line probe signal to obtain information regarding the transmission medium;

sending the information to a second location; and executing second processing on the information at the second location to determine a transmission rate for the transmission medium, wherein executing second processing on the information at the second location to determine a transmission rate for the transmission medium comprises at least:

calculating a signal to noise ratio at one or more frequency bins;

summing logarithmic values of a signal to noise ratio for the information at one or more frequency bins to generate an actual signal to noise ratio; and comparing the actual signal to noise ratio to a desired signal to noise ratio to determine at which of the one or more frequency bins the actual signal to noise ratio drops below the target signal to noise ratio.

* * * * *